US007089994B2

(12) United States Patent
Esposito et al.

(10) Patent No.: US 7,089,994 B2
(45) Date of Patent: Aug. 15, 2006

(54) COOLING SYSTEM FOR A FARM MACHINE

(75) Inventors: Giovanni Esposito, Bernareggio (IT); Pierangelo Margutti, Vaprio d'Adda (IT); Wolfgang Baur, Aislingen (DE)

(73) Assignee: Same Deutz-Fahr Group S.p.A., Treviglio (Bergamo) (IT)

( * ) Notice: Subject to any disclaimer, the term of this patent is extended or adjusted under 35 U.S.C. 154(b) by 195 days.

(21) Appl. No.: 10/720,223

(22) Filed: Nov. 25, 2003

(65) Prior Publication Data

US 2004/0226683 A1 Nov. 18, 2004

(30) Foreign Application Priority Data

Feb. 21, 2003 (IT) .......................... TO2003A0127

(51) Int. Cl.
*B60H 1/00* (2006.01)

(52) U.S. Cl. ............................ 165/42; 165/77; 165/86; 180/68.4; 180/68.6

(58) Field of Classification Search .................. 165/41, 165/42, 43, 44, 202, 67, 76, 77, 86, 51; 180/68.1, 180/68.2, 68.4, 68.6

See application file for complete search history.

U.S. PATENT DOCUMENTS

| 4,696,361 A | 9/1987 | Clark et al. |
| 5,234,051 A | 8/1993 | Weizenburger et al. |
| 6,092,616 A | 7/2000 | Burris et al. |
| 2002/0104491 A1 | 8/2002 | Izumi |

FOREIGN PATENT DOCUMENTS

| EP | 1 098 073 A | 5/2001 |
| JP | 09 089 488 A | 4/1997 |
| JP | 2000 310 119 A | 11/2000 |

*Primary Examiner*—Ljiljana Ciric
(74) *Attorney, Agent, or Firm*—Sughrue Mion, PLLC

(57) ABSTRACT

A cooling system for a farm machine comprises a heat exchange assembly (1) having a plurality of radiators (2, 3, 4, 5) arranged one close to the other and so as to be passed through by a same air flow. According to the invention, at least a first radiator (3, 4, 5) can be shifted angularly with respect to a second radiator (2, 3, 4), so as to make cleaning operations for the latter easier.

17 Claims, 5 Drawing Sheets

COOLING SYSTEM FOR A FARM MACHINE

FIELD OF THE INVENTION

The present invention refers to a cooling system for a farm machine.

BACKGROUND OF THE INVENTION

The engine of a farm machine is usually equipped with a cooling system comprising a heat exchange assembly including one or more radiators, typically a radiator for engine cooling, an intercooler and a radiator for gearshift oil cooling; in some cases the heat exchange assembly can also include a radiator belonging to an air conditioning unit of the farm machine cabin. Radiators are arranged so as to receive each a cooling air flow directed perpendicularly to their respective front surface.

Traditionally, the heat exchange assembly is housed within a front bonnet of the machine, equipped with grille-like ventilation openings, provided on the side and/or on the front of said bonnet. Normally, said grille-like openings are designed to keep large-size impurities outside and enable an air filtration degree ensuring for most working activities in the fields a certain number of working hours before both the grilles and the radiators get choked up. Under extreme conditions, i.e. when the machine works in highly contaminated conditions, the grille-like openings are not able to ensure a sufficiently high filtering degree to prevent radiators from getting choked up. This is for instance the case in which the farm machine works in conditions of high concentration of air impurities (such as chaff, residues of cutting-up or haymaking operations, seeds, graminaceous plants or infesting weeds, poplar inflorescences, etc.), which can generally pass through hood grilles and choke up radiators, due the action of the cooling air flow. The consequent risk is an engine over-heating with subsequent performance loss. Under these conditions the operator should stop working operations, get off the machine, remove and clear bonnet grilles, reach the heat exchange assembly and clean it. Note that too high a filtration degree carried out by bonnet grille-like openings would jeopardize the passage of cooling air under normal conditions, i.e. during most of the working operations performed by the machine.

Cleaning operations on the heat exchange assembly are particularly uncomfortable since they have to be carried out in the fields.

A known solution, aiming at simplifying the aforesaid cleaning operations, envisages to arrange the various radiators orthogonal one to the other, so that their respective front surfaces are directly accessible for manually removing impurities by an operator. Said solution results in a large size of the heat exchange assembly and difficulty in managing several cooling air flows, which have each to pass through a respective radiator.

In most cases, however, the various radiators are arranged parallel to one another, in sequence and very close one to the other, so that the radiator pack thus formed can receive a cooling air flow directed perpendicularly to one of its front surfaces; said solution greatly simplifies assembly cooling, since the same air flow can pass through all radiators provided for. One or more radiators of such assembly can be mounted onto cross guides, so as to be laterally shifted after lifting the machine bonnet, in order to carry out cleaning and washing operations. The room available in the engine compartment of the machine, however, is usually quite narrow, which enables only a partial extraction of the concerned radiator with respect to the remaining part of the heat exchange assembly; this makes cleaning operations difficult and does not allow to remove completely foreign bodies from the whole front surface of the radiator partially taken out.

SUMMARY OF THE INVENTION

The present invention aims at carrying out a cooling system for a farm machine, comprising various radiators very close one to the other, which overcomes the aforesaid drawbacks.

The present invention provides a cooling system for a farm machine comprising a heat exchange assembly designed to receive a cooling air flow in a direction substantially perpendicular to one end surface thereof, said assembly comprising at least a first and a second radiator disposed adjacent each other so as to be passed through by said airflow wherein hinging means are associated to at least the first radiator to enable the first radiator to pivot with respect to the second radiator between a respective operating position and a respective non operating position.

Other objects and advantages of the invention will be apparent from the following description taken in conjunction with the accompanying drawings.

BRIEF DESCRIPTION OF THE DRAWINGS

The present invention shall now be described in detail with reference to the accompanying drawings, provided as a mere non-limiting example, in which.

DETAILED DESCRIPTION OF THE INVENTION

Figure 1:
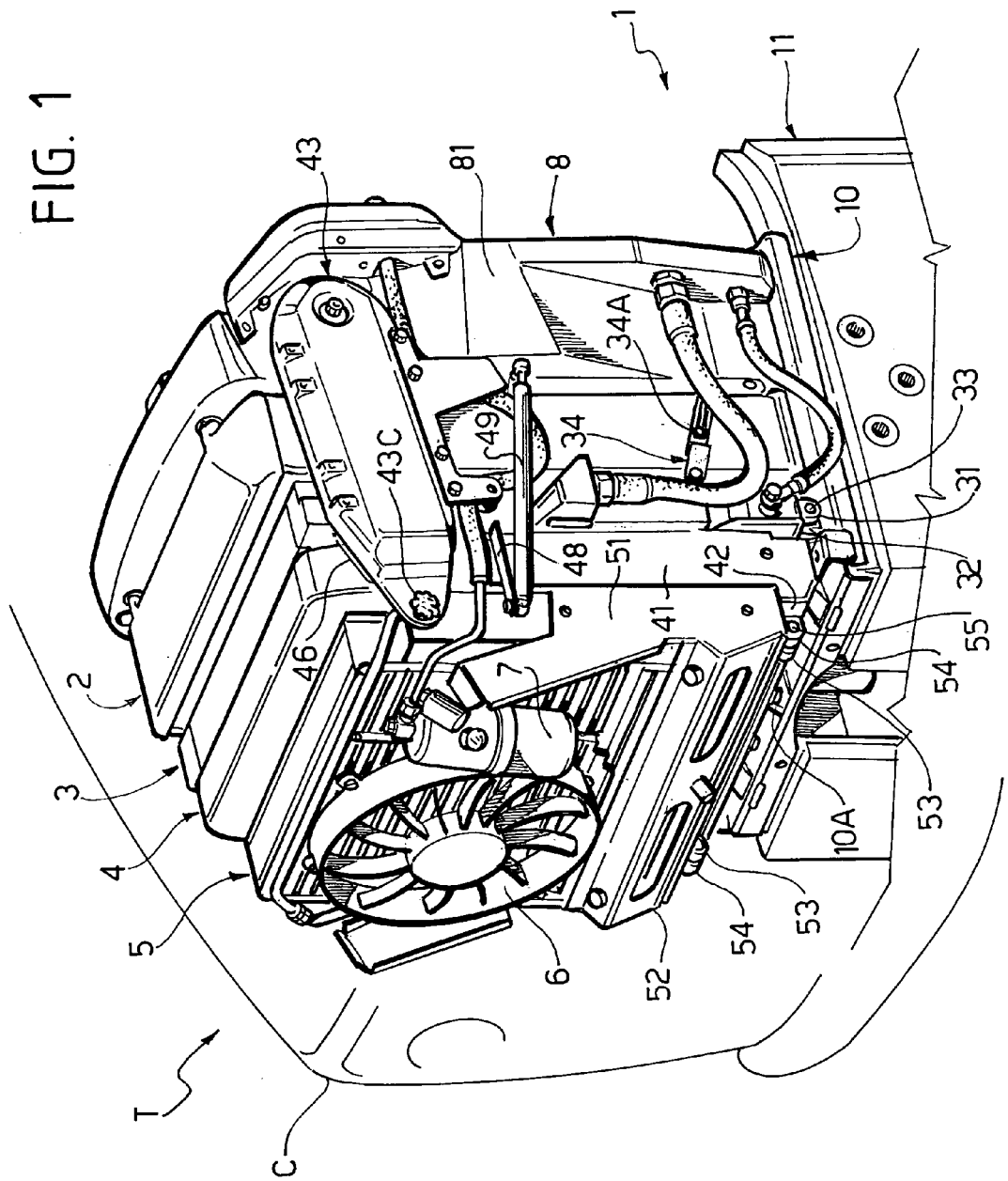
FIG. 1 is a perspective view showing the front part of a farm tractor equipped with a cooling system according to the present invention.

With reference to FIG. 1, T indicates the front portion of a farm tractor, comprising a bonnet C housing the internal combustion engine of the tractor, not shown. The present invention relates specifically to a farm tractor, but obviously it may also be applied to other types of farm machines, such as for instance combine-harvesters and the like.

The hood C is provided with grille-like openings, not shown, for inlet and outlet of a cooling air flow. A heat exchange assembly, globally referred to with number 1, is housed in the front portion of the bonnet C. The heat exchange assembly 1 comprises an engine radiator 2, a gearshift oil radiator 3, a radiator 4 of an intercooler system, and a radiator 5 belonging to an air conditioning unit of the tractor cabin; the radiator 5 is associated in quite a conventional way with a respective fan 6 and a de-hydrating filter 7. As can be seen in particular in FIG. 2, the various radiators 2–5 of the assembly 1, globally prism-shaped, are arranged in sequence very close to one another, the larger surfaces of the various radiators being substantially parallel one to the other.

Figure 2:
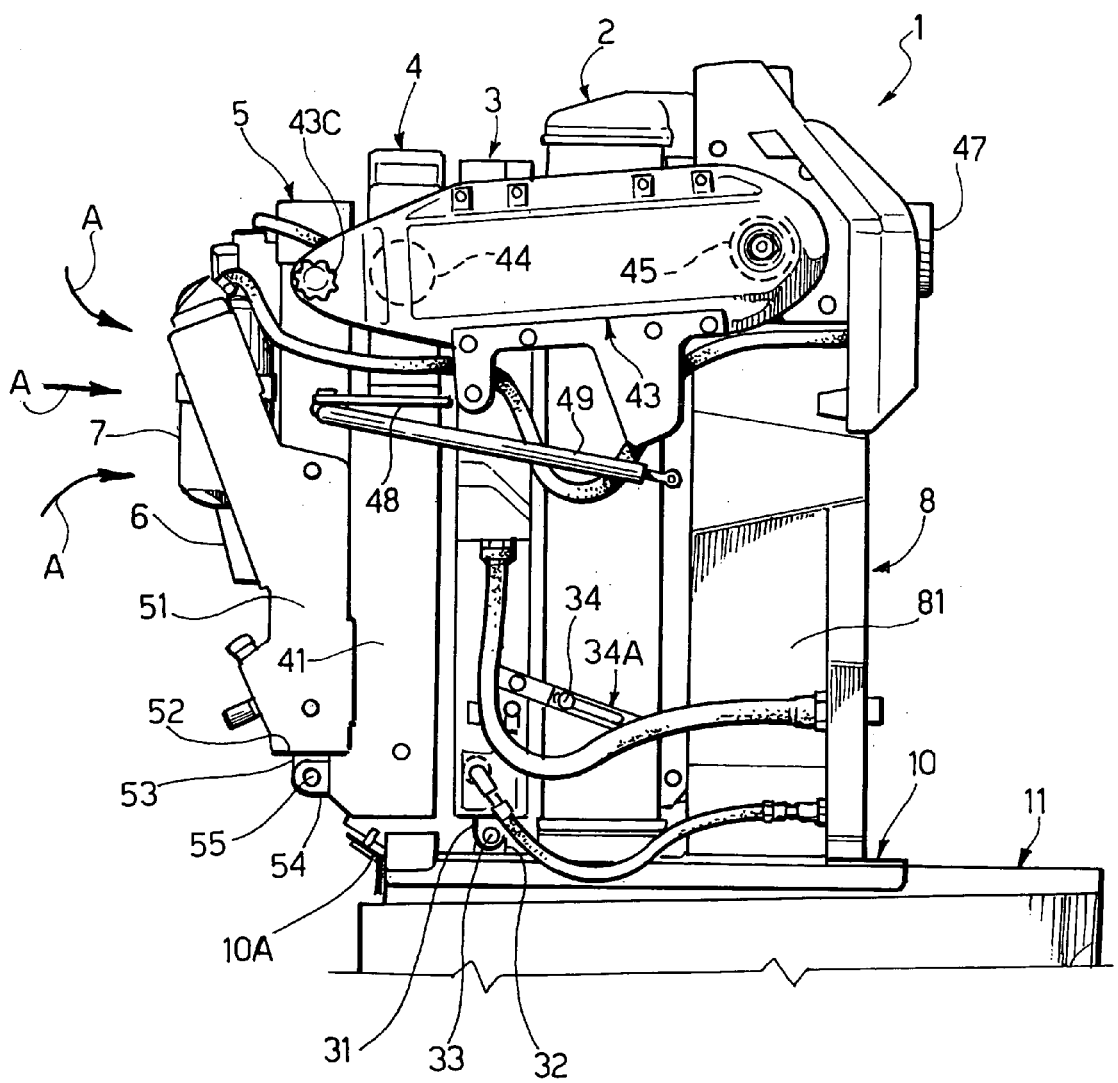
FIG. 2 is a schematic lateral view of a heat exchange assembly belonging to the cooling system of the tractor of FIG. 1, in a corresponding operating position.
Figure 3:
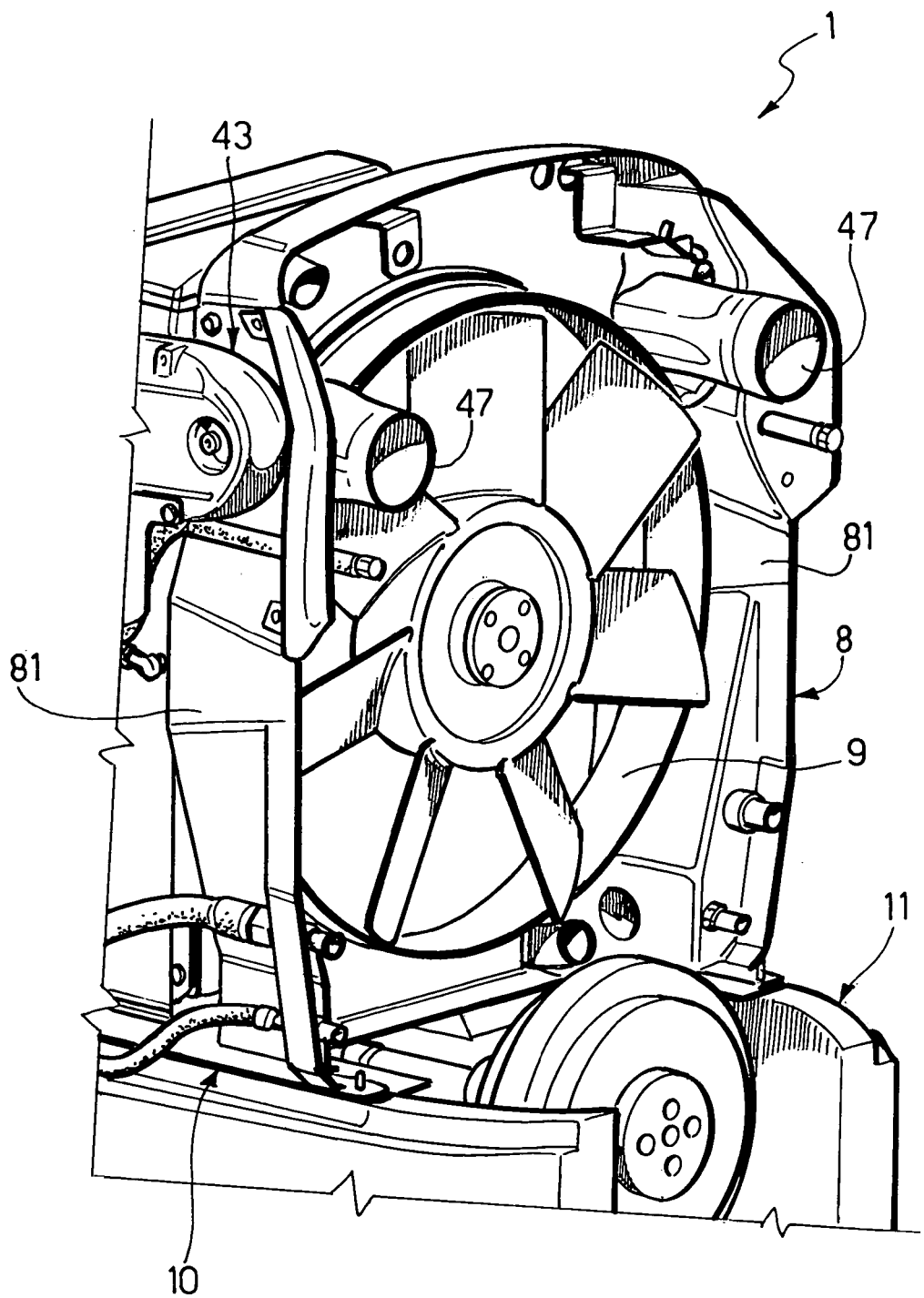
FIG. 3 is a partial, schematic perspective view of the heat exchange assembly of FIG. 1, seen from its rear portion, in the aforesaid operating position.

As shown in FIG. 3, a ventilation assembly comprising a conveyor 8 and a suction fan 9, actuated for instance by a belt, not shown, is mounted onto the rear portion of the heat exchange assembly 2. In quite a conventional way, the fan 9 generates an air flow referred to by arrows A in FIG. 2, extending in a substantially orthogonal direction with respect to a front surface of the assembly 1, here represented by the front surface of the radiator 5. In the embodiment shown in the figures, number 10 refers to a lower support base, extending frontally from the lower portion of the conveyor 8 and fastened to a front support 11 of the tractor.

The radiator 2 is mounted in a stationary position with respect to the base 10 and to the conveyor 8, close to the latter.

Figure 5:
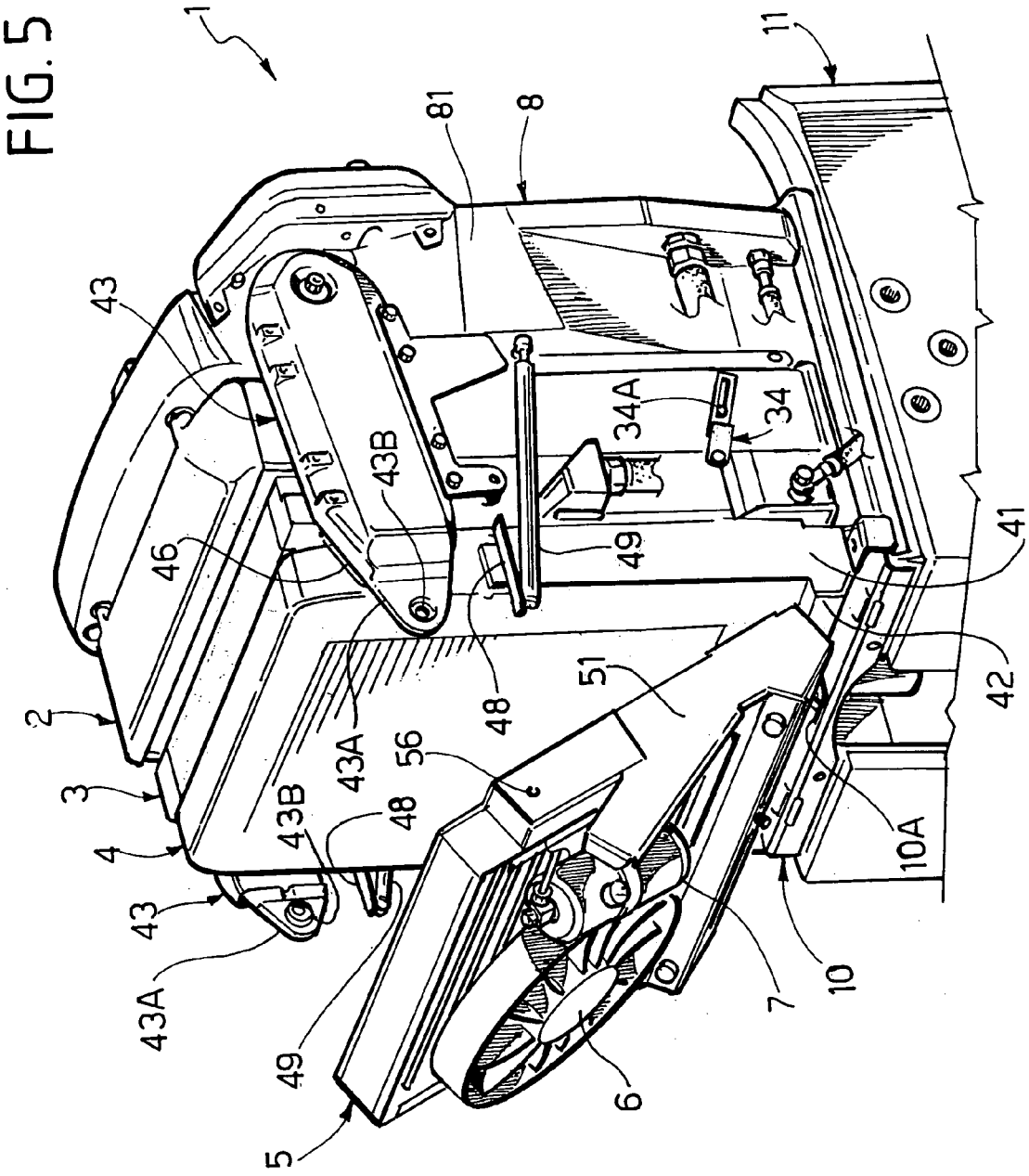
FIG. 5 is a perspective view of the heat exchange assembly of FIG. 1, in a corresponding second non-operating position.

The radiator 4 comprises a frame having two lateral uprights, one of which referred to with 41, and a lower cross-piece 42. The radiator 4 with its frame is articulated so as to be shifted angularly. The means carrying out said articulation comprise two lateral arms extending longitudinally, one of which referred to with 43 in the figures; an end of each arm 43 is coupled in a stationary way to a respective upright 41 and to the radiator 4, whereas the opposite end is coupled turnably to a respective lateral wall 81 of the conveyor 8. The lateral arms 43 are hollow inside and belong each to a duct for the fluid passing within the radiator 4; in particular, the arm 43, which can be seen only partially in FIG. 5, belongs to an air intake branch coming from a turboblower, which air should be cooled within the radiator of the intercooler, whereas the arm 43 placed on the opposite side, and well visible in the figures, belongs to an air return branch for air cooled by the intercooler back to the engine.

To said purpose, each arm 43 has respective openings, schematically referred to with 44 and 45 in FIG. 2, defined on the side towards the radiator 4 and the wall 81 of the conveyor 81; the opening 44 communicates with a passage defined in the corresponding upright 41 and in the lateral wall of the radiator 4, suitable sealing means being placed in between, comprising for instance a seal referred to with 46 in FIG. 1, or by direct welding onto the radiator 4; the opening 45 leans against the outer surface of the wall 81 of the conveyor 8, on a hole defined in said wall 81, suitable sealing means being placed in between; on the outer surface of said wall 81, on said hole, a sleeve or the end of a conveying tube for intercooler air is fastened; in FIG. 3 number 47 refers to the two aforesaid sleeves, fastened within the wall 81, which cooperate each with a respective arm 43. The turnable coupling between the end of the arm 43 on which the opening 45 resides and the wall 81 of the conveyor 8 can be achieved in any known way, provided that at least in the operating position of the assembly 1, as represented in FIGS. 1-3, the sleeves 47 are in fluid communication with the inner cavity of their respective arm 43, so as to enable the passage of air to be cooled by the radiator 4. As can be inferred, the arms 43 can be shifted angularly with respect to the wall 81, so as to rotate upwards around a horizontal axis substantially coaxial with the openings 45.

Figure 4:
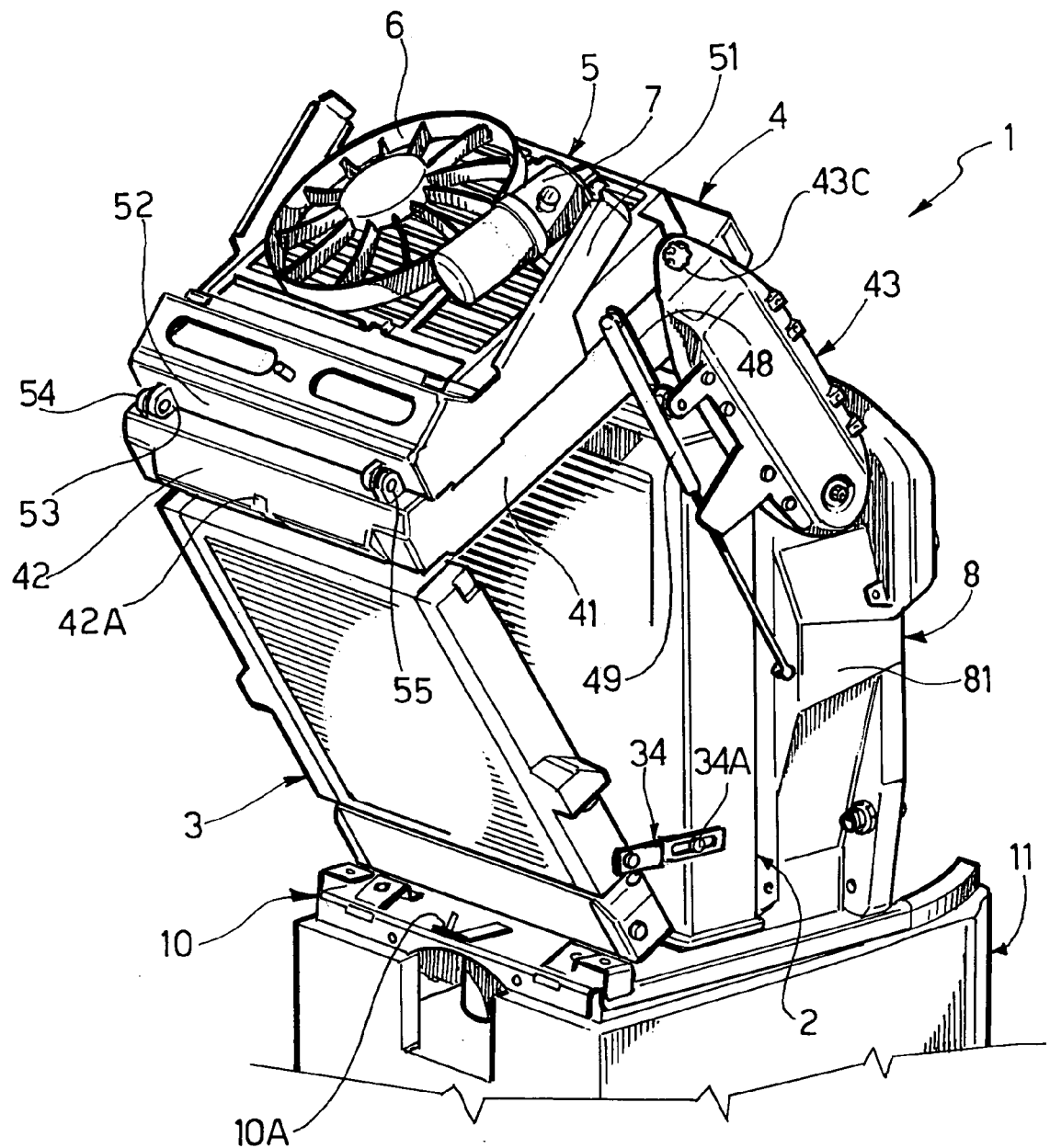
FIG. 4 is a perspective view of the heat exchange assembly of FIG. 1, in a corresponding first non-operating position.

Each upright 41 of the frame of the radiator 4 is integral with a corresponding bracket 48, to which an end of a gas spring 49 is fastened, the other end of said spring being articulated to the structure of the conveyor 8; the frame of the radiator 4 then has in the central area of its lower cross-piece 42 an engagement seat, referred to with 42A in FIG. 4, for a moving hook 10A mounted onto the base 10; said seat 42A and the hook 10A belong to a known blocking/release device, here shown only schematically, for keeping the radiator 4 in its respective operating position:

In an advantageous embodiment of the invention, also the radiator 3 is mounted so as to be shifted angularly. To said purpose, the frame of the radiator 3 comprises in its lower portion two lateral eyelets, only one of which is visible in the figures, where it is referred to with 31; the central hole of each eyelet 31 is coaxial with the hole of a corresponding eyelet protruding from the base 10; one of the two eyelets of the base 10 is referred to with 32 in FIG. 2; a respective pin 33 is fitted into the holes of the eyelets 31, 32, which pin is kept in position in per se known ways (for instance through plugs or elastic rings). The pairs of eyelets 31, 32 and their respective pins 33 form hinging means for the radiator 3, so as to enable its angular forward shift.

To the lateral wall of the frame of the radiator 3 a bracket 34 having a longitudinally extending slot is fastened, into which bracket a pin 34A integral with the corresponding lateral wall of the frame of the radiator is slidingly engaged, the bracket 34 and the pin 34A thus carrying out stroke-end means designed to limit the angular shift admitted for the radiator 3 with respect to the radiator 2. In a possible embodiment, the pin 34A can be shaped as a screw, so as to form together with the bracket 34 a blocking/release device for the radiator 3 (in practice, the screw 34A being tightened, the bracket 34 keeps the radiator 3 against the radiator 2, whereas the screw 34A partially loosened, the presence of the slot enables the bracket 34 to slide with respect to said screw). As an alternative, for instance on the side of the assembly 1 opposite the side with the bracket 34, between the radiators 2 and 3 a known hooking system can be mounted, designed to keep the radiator 3 close and parallel to the radiator 2.

In a particularly preferred embodiment of the invention, also the structure of the radiator 5 can make angular forward shifts. In the case shown by way of example in the figures, the radiator 5 is thus associated with a frame having two lateral uprights 51 and a lower cross-piece 52. The lower cross-piece is associated with two eyelets 53, whose holes are coaxial with the holes of corresponding eyelets 54 frontally protruding from the cross-piece 42 of the frame of the radiator 4; a respective pin 55 is fitted into the holes of the eyelets 53, 54, which pin is kept in position in per se known ways (for instance through plugs or elastic rings). The pairs of eyelets 53, 54 and their respective pins 55 form hinging means for the radiator 5 with respect to the radiator 4, so as to enable its angular forward shift.

Here again means for keeping the radiator 5 in its normal operating position, i.e. against the radiator 4, are envisaged. In the case shown by way of example, each arm 43 has a respective end extension 43A, equipped with a threaded hole 43B (see FIG. 5), into which the screw-shaped stem of a hand grip 43C is screwed. The free end of the stem of the hand grip 43C can be engaged or screwed into a corresponding seat 56 obtained on a respective lateral wall of the frame of the radiator 5. Obviously, as an alternative to the system disclosed by way of example, other known systems for blocking/releasing the structure of the radiator 5 with respect to the one of the radiator 4 can be envisaged. Here again stroke-end means limiting the angular forward shift of the radiator 5 can be envisaged; in the simplest embodiment, said means can consist of the flexible intake and return tubes for the fluid that has to pass within the radiator 5.

Finally, the assembly 1 is equipped with an electric cable for the fan 6, not visible, and with flexible intake and return tubes for the fluids that have to pass within the radiators 2–5; some of these tubes can be seen in FIGS. 1–3. Note that in the operating position shown in FIGS. 1–3, the aforesaid cable and the various flexible tubes belonging to the radiators 3 and 5 define loops, so as to enable, when necessary, the angular shift of said radiators.

The general working of the cooling system comprising the heat exchange assembly 1 is known per se, so that the following shall describe only the operations required to clean the radiators 2–5.

In normal operating conditions of the tractor, the assembly 1 looks as can be seen in FIGS. 1–3, in which the various radiators 2–5 are leaning one against the other, substantially parallel to one another, and kept in position through their respective blocking/release means; the actuation of the fan 9 causes the formation of the air flow A of FIG. 2, which passes through the various radiators 2–5. When the assembly 1 has to be cleaned, the operator stops the tractor and lifts the bonnet C.

The blocking/release device comprising the seat 42A and the hook 10A (FIG. 1) is led to its release position and thanks to the actuation of the gas springs 49 the structure of the radiator 4 automatically shifts angularly upward together with the radiator 5, so as to reach the non-operating position visible in FIG. 4; in this case, the stroke-end means limiting the angular shift of the radiator 4 are formed by said gas springs; the angular shift is enabled by the articulation system comprising the arms 43, which, as was mentioned, on one side are fastened to the frame of the radiator 4, and on the other side are turnably associated with the structure of the conveyor 8. As can be inferred, in said non-operating condition almost the whole front surface of the radiator 3 can be accessed directly by the operator, so as to carry out required cleaning operations. After that, also the aforesaid blocking/release device operating between the radiator 3 and the radiator 2 (which, as was said, can consist of the bracket 34 and of the screw 34A) can be led to its respective release position; the operator can thus shift the radiator angularly forward, thanks to the presence of the hinging system comprising the pairs of eyelets 31-32 and their respective pins 33; the stroke-end means comprising the bracket 34 and the pin/screw 34A limit the angular movement of the radiator 3 and enable it to keep the non-operating position reached. The radiator 3 thus lies in the position visible in FIG. 4, in which almost the whole front surface of the radiator 2 can now be directly accessed by the operator, so as to carry out required cleaning operations. After cleaning the radiators 2 and 3, the latter can be led back to its original position, and here blocked by means of its respective blocking/release device 34–34A. After that, the radiator 4 can be lowered together with the radiator 5, and thus be led back to its original position, in which it is blocked by means of its respective hooking device 42A, 10A. The hand grips 43A can then be completely removed, as in the case shown by way of example in FIG. 5, or partially unscrewed, so that the operator can shift the radiator 5 angularly forward, thanks to the presence of the hooking system consisting of the pairs of eyelets 53–54 and of their respective pins 55, up to the position visible in FIG. 5; as was said, it is provided for suitable stroke-end means, so as to limit the angular shift admitted for the radiator 5; in the non-operating position of the radiator 5, which can be seen in FIG. 5, almost the whole front surface of the radiator 4 can now be accessed directly by the operator, so as to carry out required cleaning operations. Once said operations are ended, the radiator 5 can be led back to the position against the radiator 4, so as to be blocked again in position by means of the hand grips 43C.

From the above description it can be inferred that the system according to the invention enables to carry out effective and complete cleaning operations on the front surfaces of the various radiators provided for, easily and rapidly, with manifest advantages; the system described above ensures at the same time a compact structure for the heat exchange assembly and an optimal exploitation of the cooling air flow passing through the various radiators.

Obviously, though the basic idea of the invention remains the same, construction details and embodiments can vary with respect to what has been described and shown by mere way of example, and the various functional components can be replaced by elements technically equivalent to those shown as examples.

In the embodiment shown by way of example, the arms 43 partially work as ducts for the intercooler radiator, and in said light their inner cavity and its end openings should have an appropriate section; it should further be pointed out that the arm articulation system could be used to shift angularly also a radiator differing from the one of the intercooler system, and that the arms 43 could also not be hollow inside; in such a case, the radiator articulated by means of said arms would be connected to usual flexible fluid intake and return tubes.

What is claimed is:

1. Cooling system for a farm machine, comprising a heat exchange assembly (1) designed to receive a cooling air flow (A) in a direction substantially perpendicular to an end surface thereof, said assembly (1) comprising at least a first and a second radiator (2, 3, 4, 5) facing each other so as to be passed through by said air flow (A), wherein hinging means (31–33; 43, 53–55) are associate with at least the first radiator (3, 4, 5), designed to enable the angular shift of the first radiator (3, 4, 5) with respect to the second radiator (2, 3, 4), between a respective operating position and a respective non-operating position, wherein the hinging means comprise at least an articulation arm (43) angularly movable around a respective rotation axis, wherein the arm (43) has an inner cavity which constitutes a passage duct for a fluid passing within the first radiator (4), wherein the arm (43) has a first area coupled in a stationary way with a lateral surface of the first radiator (4), and a second area coupled turnably with a support structure (81), said cavity having a first opening (44) on the first area, which is in fluid communication with the first radiator (4), and a second opening (45) on the second area, which is in fluid communication with a respective tube (47) of said fluid, wherein the hinging means comprise two of said articulation arms (43), an arm (43) belonging to an inlet duct of said fluid into the first radiator (4) and the other arm (43) belonging to an outlet duct of said fluid from the first exchanger (4).

2. System according to claim 1, wherein in said operating position the first radiator (3, 4, 5) is substantially parallel to the second radiator (2, 3, 4), and in that in said non-operating position the first radiator (3, 4, 5) is arranged angularly with respect to the second radiator (2, 3, 4).

3. System according to claim 1, wherein that the hinging means (43) are designed to enable an angular forward shift of the first radiator (4) with respect to the second radiator (3).

4. System according to claim 1, wherein a device (10A, 42A; 34, 34A; 43A, 43B, 43C, 56) is provided that can be switched between a blocking condition and a release condition, in its blocking condition said device (10A, 42A; 34, 34A; 43A, 4313, 43C, 56) keeping the first radiator (3, 4, 5) in its operating position, and in the release position said device (10A, 42A; 34, 34A; 43A, 43B, 43C, 56) enabling the shift of the radiator (3, 4, 5) to its non-operating position.

5. System according to claim 4, wherein actuating means (48) is provided to shift automatically the first radiator (4)

from its operating position to its non-operating position as a result of the switching of said device (10A, 42A; 34, 34A; 43A, 43B, 43C, 56) to its respective release condition, said actuating means comprising in particular at least a gas spring (49).

6. System according to claim 1, wherein stopping means (34, 34A; 49) is provided, designed to limit the angular shift admitted for the first radiator (3, 4, 5).

7. System according to claim 1, wherein the hinging means (31–33; 53–55) are operatively coupled with the lower portion of the first radiator (3,5).

8. System according to claim 1, wherein the second radiator (3, 5) is associated with respective hinging means (31–33; 53–55), designed to enable the angular shift of the second radiator (3, 5) between a respective operating position and a respective non-operating position.

9. System according to claim 8, wherein the second radiator (3) can be shifted angularly with respect to a further radiator (2) of said assembly (1), when the first radiator (4) is in its respective non-operating position.

10. System according to claim 9, wherein the further radiator is a radiator for cooling an engine (2).

11. System according to claim 1, wherein said assembly (1) comprises at least a third radiator (5), to which respective hinging means (53–55) are associated, designed to enable the angular shift of the third radiator (5) between a respective operating position and a respective non-operating position.

12. System according to claim 11, wherein the third radiator (5) can be angularly shifted with respect to the first radiator (3).

13. System according to claim 12, wherein the third radiator (5) is articulated to the first radiator (3) by means of its respective hinging means (53–55).

14. System according to claim 11, wherein the third radiator (3) is a radiator of an air conditioning system.

15. System according to claim 1, wherein the first radiator (4) belongs to an intercooler system.

16. System according to claim 1, wherein the second radiator is a radiator (2, 3) for cooling an oil or a motor.

17. System according to claim 1 wherein said first area of the articulation arm (43) is coupled turnably with a respective wall (81) of a conveying element (8) in which operates a suction fan (9) inducing said air flow (A).

* * * * *